US007022631B2

(12) United States Patent
Schmid

(10) Patent No.: US 7,022,631 B2
(45) Date of Patent: Apr. 4, 2006

(54) SEALING TAPE

(75) Inventor: Oliver Schmid, Gingen a.d. Fils (DE)

(73) Assignee: Schmid Baukunststoffe GmbH, Gingen a.d. Fils (DE)

( * ) Notice: Subject to any disclaimer, the term of this patent is extended or adjusted under 35 U.S.C. 154(b) by 138 days.

(21) Appl. No.: 10/437,928

(22) Filed: May 15, 2003

(65) Prior Publication Data

US 2003/0216097 A1 Nov. 20, 2003

(30) Foreign Application Priority Data

May 17, 2002 (DE) ................................ 102 22 069

(51) Int. Cl.
*B32B 27/04* (2006.01)
*E06B 1/62* (2006.01)

(52) U.S. Cl. ...................... 442/381; 442/149; 428/343; 428/354

(58) Field of Classification Search ................ 442/149, 442/151, 381; 428/354, 343
See application file for complete search history.

(56) References Cited

U.S. PATENT DOCUMENTS 5,494,720 A * 2/1996 Smith et al. .................. 428/57
6,725,610 B1 * 4/2004 Murphy et al. ................ 52/58
2001/0034984 A1 * 11/2001 Murphy et al. ............ 52/204.5
2003/0216097 A1 * 11/2003 Schmid ...................... 442/381

FOREIGN PATENT DOCUMENTS

DE 296 05 456 U1 8/1996
DE 201 17 273 U1 2/2002

OTHER PUBLICATIONS

DE 20117273 Derwent Patent Abstract; Publication Jan. 10, 2002.*

* cited by examiner

*Primary Examiner*—Daniel Zirker
(74) *Attorney, Agent, or Firm*—Venable LLP; Robert Kinberg; Ryan M. Flandro

(57) ABSTRACT

A sealing tape is provided for sealing connecting joints between a window frame and a window embrasure in a building. The sealing tape is for adhering to the window frame and the window embrasure. The tape has an elastically moldable membrane base material; and a nonwoven layer of adhesion material covering at least one surface of the base material and which is elastically expandable in a lateral direction of the sealing tape for absorbing movements between the window frame and the window embrasure and which is substantially non-expandable in a longitudinal direction of the sealing tape so as to provide a sufficiently high yield strength of the sealing tape during use. The nonwoven layer is such that stucco or plaster can adhere to it.

18 Claims, 3 Drawing Sheets

SEALING TAPE

CROSS-REFERENCE TO RELATED APPLICATION

This application claims priority to German Patent Application No. 102 220 69.7, filed May 17, 2002, the disclosure of which is incorporated herein by reference.

BACKGROUND OF THE INVENTION

The invention relates to a sealing tape for sealing connecting joints between a window frame and a window embrasure (reveal or jamb) in a building. A sealing tape of this type is known, for example, from German reference DE 296 105 456 U1.

The installation of a self-adhesive sealing tape between the inside surface of the embrasure and the back of the window frame is known from German reference DE 296 05 456 U1 for sealing the connecting joints in a building between the window frame and the embrasure for the associated window cutout against penetrating moisture. During the subsequent finishing of the inside surface of the embrasure, the sealing tape is covered with plaster or stucco. The known sealing tape consists of a sticky butyl rubber tape, covered on its underside with a protective pull-off layer and on its top with a layer of nonwoven textile material. A narrow adhesive layer that is protected by a pull-off film is provided along the edges of the nonwoven material layer. During the installation and following the removal of the protective pull-off layer and the pull-off film, the narrow adhesive layer is attached to the back of the window frame while the exposed underside of the butyl rubber strip is glued onto the inside surface of the window embrasure. The exposed area of the nonwoven material in this case forms a layer to which the plaster or stucco can adhere.

SUMMARY OF THE INVENTION

The known sealing tape has the disadvantage that it cannot follow movements caused by thermal conditions between the window frame and the window embrasure since the nonwoven textile layer is not elastic. This lack of elasticity can lead to the formation of cracks in the layer of stucco or plaster that is applied to the nonwoven material. To counter this disadvantage, a modified version of the above sealing tape uses a reinforced, tear-resistant aluminum foil with a plastic nonwoven material glued to one side as base material (such as "FENSTER-FLEXFOLIE INNEN" by the Company Illbruck Bau-Produkte GmbH & Co. KG in Leverkusen). The aluminum foil is provided with a movement loop or expansion fold, attached so as to be detachable, which functions as expansion reserve for thermal movements between the window frame and the window embrasure. Butyl layers on both sides of the sealing tape, which are protected by pull-off foils, are used for gluing the tape to the window frame and the window embrasure. However, this detachably fixed movement loop restricts the options for installing the sealing tape since the sealing tape must always be glued to the window frame back in such a way that the movement loop and/or the expansion fold is flush with the frame inside surface. In addition, the cost of producing the movement loop and/or the expansion fold is high and the process is involved.

Thus, it is an object of the invention to create a sealing tape of the aforementioned type that can elastically follow the movements between the window frame and the window embrasure and can be produced easily and cost-effectively.

This object is solved according to the invention with a sealing tape for sealing connecting joints between a window frame and a window embrasure in a building. The sealing tape is for adhering to the window frame and the window embrasure. The tape has an elastically moldable membrane base material; and a nonwoven layer of adhesion material covering at least one surface of the base material and which is elastically expandable in a lateral direction of the sealing tape for absorbing movements between the window frame and the window embrasure and which is substantially non-expandable in a longitudinal direction of the sealing tape so as to provide a sufficiently high yield strength of the sealing tape during use. The nonwoven layer is such that stucco or plaster can adhere to it.

The invention is based on the idea of using an elastically moldable membrane, having a plastic foil, as base material for the sealing tape. A layer of nonwoven material is laminated or glued onto this membrane as adhesive material for plaster or stucco. The nonwoven material can expand elastically in the lateral direction of the sealing tape, such that it can absorb movements between the window frame and the window embrasure. The nonwoven material used does not expand at all or only slightly in longitudinal direction of the sealing tape, so as to ensure a sufficiently high yield strength for the sealing tape use. The membrane preferably is coated on both sides with the nonwoven material for adherence. The elastically moldable membrane used on the inside areas of buildings has a foil material that resists diffusion. Thus, water vapor from the inside of the building cannot diffuse through the sealing tape and into the brickwork. The elastically moldable membrane used on the outside areas of buildings has a foil material that permits diffusion. Water vapor that has entered the building from the outside thus can diffuse through the sealing tape to the outside environment.

Suitable self-adhesive layers can be provided on one or both of the nonwoven layers for affixing the sealing tape according to the invention to the window embrasure and the window frame. As an alternative to self-adhesive layers, a liquid adhesive such as an acrylate dispersion adhesive can also be applied during the installation to the predetermined locations for adhesion on the window frame and the window embrasure. Thermoplastic plastics such as polyethylene, for example, are preferably used as material for the plastic foil. Alternatively, a non-thermoplastic plastic such as polyurethane can also be used for the plastic foil. The nonwoven material used preferably is a card web for which plastics such as polyester, polypropylene or polyethylene can be provided.

The sealing tape according to the invention not only makes possible a simple, non-problematic seal between the window frame and the surrounding window embrasure, but also allows plaster or stucco to be applied to the nonwoven layer without risking a later crack forming due to thermal movements between window frame and window embrasure. Thermal movements of this type are completely absorbed in the lateral direction by the elasticity of the inventive sealing tape. The sealing tape according to the invention can be produced easily and cost-effectively in that respectively one nonwoven layer is applied to one or both sides of a plastic foil that moves continuously in the longitudinal direction. This layer is either laminated on under the effect of heat and pressure or is glued on following the insertion of adhesive material in between and under the effect of heat and pressure.

BRIEF DESCRIPTION OF THE DRAWINGS

The invention is explained below in further detail with the aid of exemplary embodiments shown in the drawings, wherein.

DETAILED DESCRIPTION OF PREFERRED EMBODIMENTS

Figure 1:
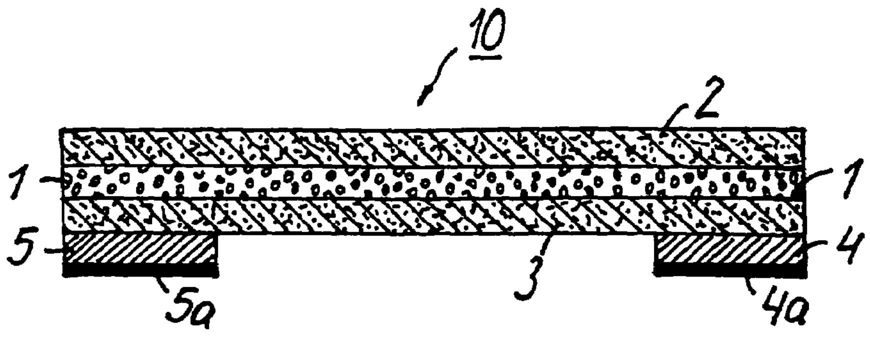
FIG. 1 is a cross section through a sealing tape according to the invention for use on the outside areas of buildings.

The sealing tape 10 according to the invention, shown in a cross-sectional view in FIG. 1, comprises an elastically moldable membrane 1 of plastic foil as a base material. Thermoplastic plastics such as polyethylene are preferably used as material for the plastic foil. Alternatively, a non-thermoplastic plastic such as polyurethane can also be used for the plastic foil. In the exemplary embodiment shown herein, the membrane 1 is covered on both sides with layers 2 and 3 of a nonwoven material. The nonwoven material is preferably card web, which preferably consist of synthetic materials such as polyester, polypropylene or polyethylene. The bottom nonwoven layer 3 for the example shown herein is provided with self-adhesive layers 4, 5 along the outside edges, which are respectively protected by a pull-off foil 4*a*, 5*a*.

Figure 2:
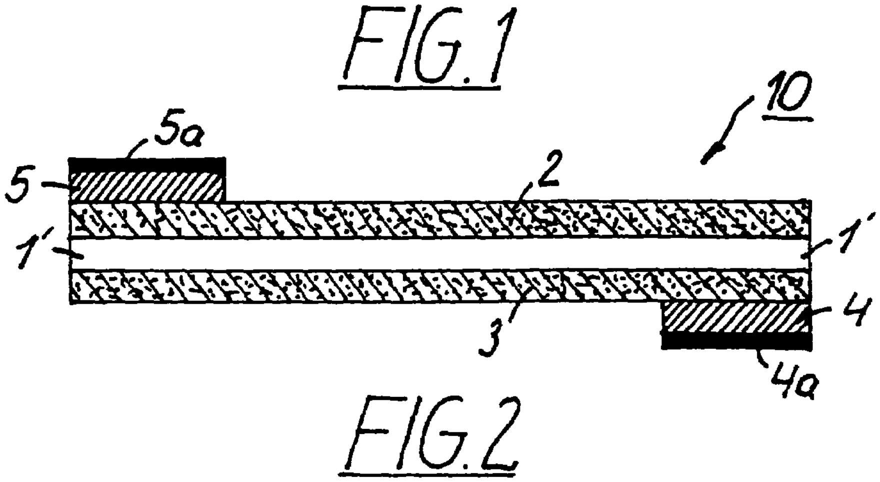
FIG. 2 is a cross section through a sealing tape according to the invention for use on the inside areas of buildings.
Figure 6:
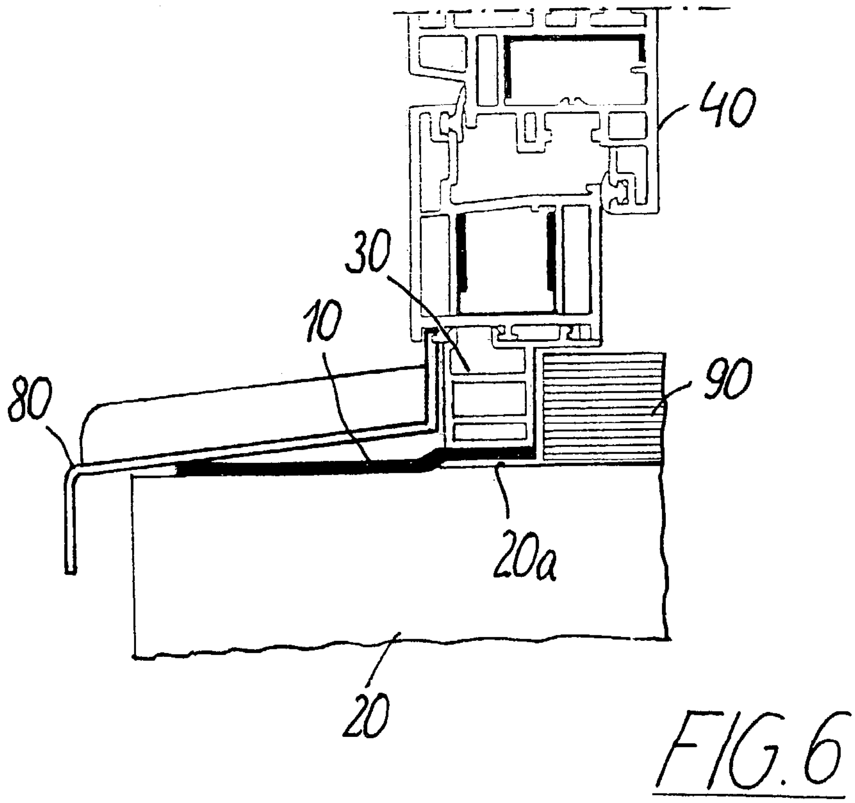
FIG. 6 shows another example for installing a sealing tape that is modified relative to the sealing tape shown in FIG. 1 on the outside of buildings.

The sealing tape shown in FIG. 6, which is a modified version of the sealing tape shown in FIG. 1, can also be provided with an alternating arrangement of the self-adhesive layers 4 and 5, as shown in the embodiment of FIG. 2.

The membrane 1 that is used on the outside areas of buildings consists of a foil material, which is simultaneously open to diffusion and watertight. As a result of the membrane 1 having the characteristic of permitting diffusion, water vapor that has penetrated from the outside into the brickwork can exit again through the sealing tape 10 to the outside. It is furthermore preferable that the foil material of the membrane 1 is watertight so that moisture such as rainwater or water from melting snow cannot reach the building inside from outside the building through the connecting joint between window frame and window embrasure. The two nonwoven layers 2, 3 expand elastically in a lateral direction of the sealing tape 10 so that they can absorb movements between the window frame and the window embrasure together with the membrane 1 that is installed in-between. The expansion folds used for the sealing tape according to the aforementioned prior art can therefore be omitted completely.

The nonwoven layers 2, 3 furthermore do not expand at all or only slightly in a longitudinal direction of the sealing tape 10. This ensures a sufficiently high yield strength when installing the sealing tape 10 and securely avoids over-expansion of the membrane 1 between the nonwoven layers 2, 3. The ability of the nonwoven layers 2, 3 to expand differently in the lateral direction than in the longitudinal direction results from the special textile structure of the nonwoven material that is used, for example card web. At the same time, plaster and stucco adhere well to the nonwoven material of layers 2, 3. Following the installation of the sealing tape 10, the exposed region of the nonwoven layer on the window embrasure can therefore be covered with a layer of plaster or can be painted with wall paint. The fibrous structure of the nonwoven material layers 2, 3 at the same time have an optically and aesthetically excellent appearance, so that the application of paint is sufficient in many cases. The self-adhesive layers 4 and 5 of the embodiment shown in FIG. 1 adhere to the window frame and the window embrasure and consist, for example, of butyl rubber or an acrylate adhesive. The pull-off foils 4*a* and 5*a* are removed just before the layers 4, 5 are glued on. A liquid adhesive, for example an acrylate dispersion adhesive such as "Folienfix", can also be applied in place of the self-adhesive layers 4, 5 to the locations on the window frame and the window embrasure that must be glued on during the installation of the sealing tape 10.

A polyethylene foil, for example, can be considered for the membrane 1 material. The nonwoven layers 2, 3, for example, can be a polyester or polypropylene nonwoven. The polyester nonwoven, for example, has a weight of 40 $g/m^2$. The sealing tape 10, available as roll goods, can have a weight of 125 $g/m^2$ and a roll length of 10 or 50 meters with a total width of 1,500 mm and a total thickness of 0.8 mm.

As a result of its composition, the sealing tape according to the invention is highly resistant to the effects of sunlight as well as acids and alkaline agents, such as can be found in rainwater. The foil material for the membrane 1, which is already resistant to UV radiation per se, is additionally protected and covered against sunlight by the light-impermeable nonwoven layers 2, 3.

The embodiment of the sealing tape 10 according to the invention shown in FIG. 2 above all differs from the embodiment shown in FIG. 1 in that the self-adhesive layers 4 and 5 are positioned alternating along the outside edges of both nonwoven layers 2, 3, meaning diagonally opposite each other. The sealing tape 10 according to FIG. 2 is furthermore provided for use on the inside of buildings. The membrane 1' of the sealing tape 10 according to FIG. 2 therefore is a material that forms a diffusion barrier. As a result of this characteristic, water vapor forming on the inside of the building, for example during the cooling of the room air, is prevented from passing through the sealing tape 10 and into the brickwork. Otherwise, the characteristics specified for the embodiment according to FIG. 1 apply in the same way also for the embodiment according to FIG. 2.

Figure 3:
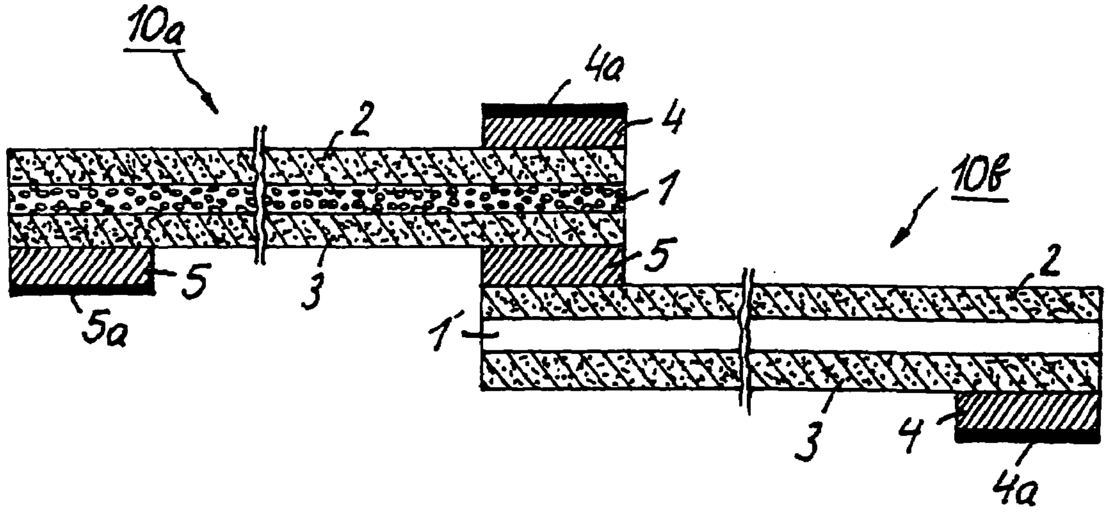
FIG. 3 is a cross section through a combination sealing tape that can be used on the inside or outside of buildings.

FIG. 3 shows that the embodiments according to FIGS. 1 and 2 can also be combined. The left sealing tape 10*a*, shown in FIG. 3, is provided for the outside area and accordingly has a membrane 1 that permits the diffusion of water vapor. In contrast, the right sealing tape 10*b*, shown in FIG. 3, is intended for the inside area and is accordingly provided with a membrane 1' that does not allow the diffusion of water vapor. The adhesive layer 5 on the right sealing tape 10*b* joins the two sealing tapes 10*a*, 10*b*.

Figure 4:
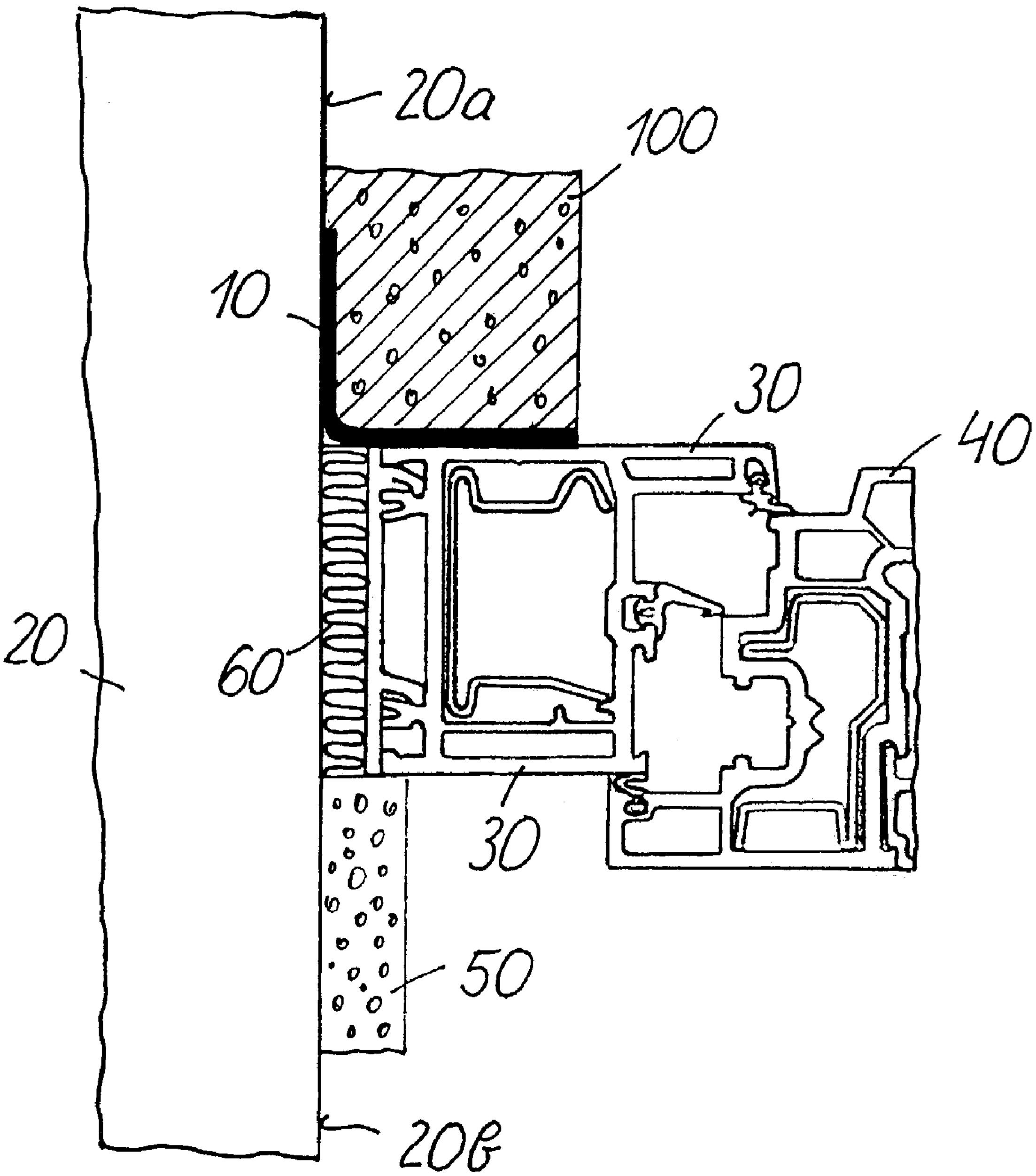
FIG. 4 shows an example for installing the sealing tape shown in FIG. 1 on the outside of buildings.
Figure 5:
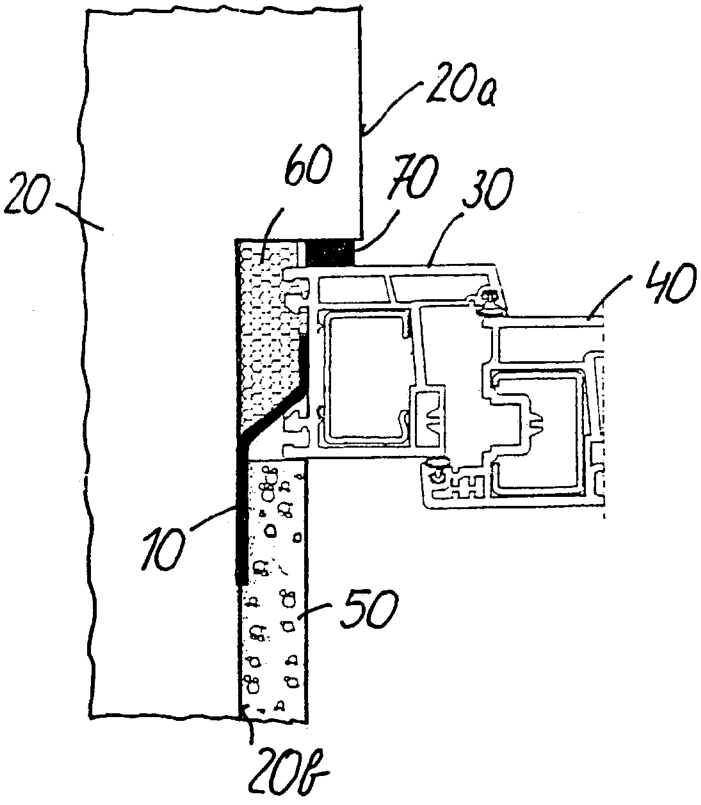
FIG. 5 shows an example for installing the sealing tape shown in FIG. 2 on the inside of buildings.

FIGS. 4 to 6 show different examples for installing the sealing tape 10 according to the invention on the outside of a building 20 (FIGS. 4 and 6) and the inside of a building 20 (FIG. 5). The outside of the window embrasure in the building 20 is given the reference 20*a* in FIGS. 4 to 6 while the inside of the window embrasure is given the reference 20*b* in FIGS. 4 and 5.

The schematically indicated sealing tape 10 is installed between the window frame 30 of window 40, shown as hollow profile, and the outside 20*a* and/or the inside 20*b* of the window embrasure. Thus, the connecting joint between the window embrasure and the window frame is sealed against moisture toward the outside (FIGS. 4 and 6) and/or the inside (FIG. 5). For this, the tape 10 adheres with one edge region to the back (FIGS. 5 and 6) and/or the outside (FIG. 4) of the window frame 30 and with its other edge region to the brickwork of the window embrasure. For mounting the window frame 30 in the window embrasure, the installation examples according to FIGS. 4 and 5 show that a synthetic foam 60, preferably polyurethane foam, is injected into the joint between the window frame 30 and the window embrasure, up to the sealing tape 10. For the case shown in FIG. 5, an elastic joint compound 70 is furthermore injected between the window frame 30 and the outside 20*a* of the window embrasure. FIG. 5 also shows the lower edge region of the sealing tape 10 extending across a portion of the inside 20*b* of the window embrasure. This edge region of the sealing tape is covered by a layer 50 of stucco or plaster, which is applied to the window frame on the inside of the window embrasure. The example according to FIG. 4 similarly shows a layer 100 of plaster or stucco applied to the outside 20*a* of the window embrasure, which covers the glued-on leg of the sealing tape 10. As a result of using the nonwoven layers 2 and 3 (FIG. 1) of the sealing tape 10 according to the invention, the stucco or plaster adheres without problems to the installed sealing tape 10.

The sealing tape 10 for the example according to FIG. 6 extends below a fascia board 80 on the outside 20*a* of the window embrasure for a building 20. The window frame 30 of the window 40 supports itself on the inside on a windowsill 90, which extends right up to the inside edge of the sealing tape 10.

For the installation example shown in FIG. 4, the self-adhesive layers 4, 5 shown in FIG. 1 are used for gluing the sealing tape 10 to the window frame 30 and to the outside 20*a* of the window embrasure. The pull-off foils 4*a*, 5*a* over these self-adhesive layers are removed just prior to the installation. For the installation examples shown in FIGS. 5 and 6, the sealing tape 10 variant according to FIG. 2 is used, which is provided with self-adhesive layers 4, 5 that are arranged on alternate sides. As previously mentioned, the use of self-adhesive layers 4, 5 is not absolutely required. The sealing tape 10 that is produced without self-adhesive layers 4, 5 can also be attached to the window frame 30 and the window embrasure by applying a liquid adhesive to the adhesion locations just prior to the tape installation, for example an acrylate dispersion adhesive.

For the production of the sealing tape 10 according to the invention, a thermoplastic plastic foil that moves continuously in a longitudinal direction is covered on one side or both sides with respectively one layer of nonwoven material that is laminated on under the effect of heat and pressure. In the process, the surface of the thermoplastic plastic foil is melted and then sticks to the nonwoven layers. Alternatively, a liquid adhesive can be injected between the two surfaces of a thermoplastic or non-thermoplastic plastic foil and the two nonwoven layers. As a result, all three layers are joined (glued together) under the effect of heat and pressure.

The invention has been described in detail with respect to preferred embodiments and it will now be apparent from the foregoing to those skilled in the art that changes and modifications may be made without departing from the invention in its broader aspects. The invention, therefore, is intended to cover all such changes and modifications that fall within the true spirit of the invention.

What is claimed is:

1. A sealing tape for sealing connecting joints between a window frame and a window embrasure in a building, the sealing tape being for adhering to the window frame and the window embrasure, the tape comprising:

an elastically moldable membrane base material for use on an inside of the building, the membrane base material comprising a foil material that forms a diffusion barrier and which has a first and a second surface; and nonwoven layers of card web covering the first and second surfaces of the membrane base material and which are elastically expandable in a lateral direction of the sealing tape for absorbing movements between the window frame and the window embrasure and which are substantially non-expandable in a longitudinal direction of the sealing tape so as to provide a sufficiently high yield strength of the sealing tape during use, wherein the nonwoven layers are adapted so that stucco or plaster adheres thereto.

2. The sealing tape according to claim 1, further comprising adhesive layers deposited near each outside edge of one of the two card web layers; and a pull-off foil covering each adhesive layer.

3. The sealing tape according to claim 2 wherein at least one of the two adhesive layers is butyl rubber.

4. The sealing tape according to claim 2 wherein at least one of the two adhesive layers is an acrylate dispersion adhesive.

5. The sealing tape according to claim 1 further comprising adhesive layers deposited near diagonally opposite-arranged outside edges of both card web layers; and a pull-off foil covering each adhesive layer.

6. The sealing tape according to claim 5 wherein at least one of the two adhesive layers is butyl rubber.

7. The sealing tape according to claim 5 wherein at least one of the two adhesive layers is an acrylate dispersion adhesive.

8. The sealing tape according to claim 1 wherein the membrane base material is a plastic foil made of a thermoplastic plastic.

9. The sealing tape according to claim 1 wherein the membrane base material is a plastic foil made of polyethylene.

10. A sealing tape for sealing connecting joints between a window frame and a window embrasure in a building, the sealing tape being for adhering to the window frame and the window embrasure, the tape comprising:

an elastically moldable membrane base material for use on an outside of the building, the membrane base material comprising a foil material that permits diffusion and which has a first and a second surface; and nonwoven layers of card web covering the first and second surfaces of the membrane base material and which are elastically expandable in a lateral direction of the sealing tape for absorbing movements between the window frame and the window embrasure and which are substantially non-expandable in a longitudinal direction of the sealing tape so as to provide a sufficiently high yield strength of the sealing tape during use, wherein the nonwoven layers are adapted so that stucco or plaster adheres thereto.

11. The sealing tape according to claim 10 further comprising adhesive layers deposited near each outside edge of one of the two card web layers; and a pull-off foil covering each adhesive layer.

12. The sealing tape according to claim 11 wherein at least one of the two adhesive layers is butyl rubber.

13. The sealing tape according to claim 11 wherein at least one of the two adhesive layers is an acrylate dispersion adhesive.

14. The sealing tape according to claim 10 further comprising adhesive layers deposited near diagonally opposite-arranged outside edges of both card web layers; and a pull-off foil covering each adhesive layer.

15. The sealing tape according to claim 14 wherein at least one of the two adhesive layers is butyl rubber.

16. The sealing tape according to claim 14 wherein at least one of the two adhesive layers is an acrylate dispersion adhesive.

17. The sealing tape according to claim 10 wherein the membrane base material is a plastic foil made of a thermoplastic plastic.

18. The sealing tape according to claim 10 wherein the membrane base material is a plastic foil made of polyethylene.

* * * * *